3,549,222
HIGH SPEED ANTI-FRICTION BEARING
Wolfgang Hansen, Krailling, and Klaus Hagemeister, Munich, Germany, assignors to Motoren- und Turbinen-Union, Munich, Germany
Filed Nov. 18, 1968, Ser. No. 776,588
Claims priority, application Austria, Nov. 29, 1967, A 10,790/67
Int. Cl. F16c *33/46, 33/66*
U.S. Cl. 308—187     11 Claims

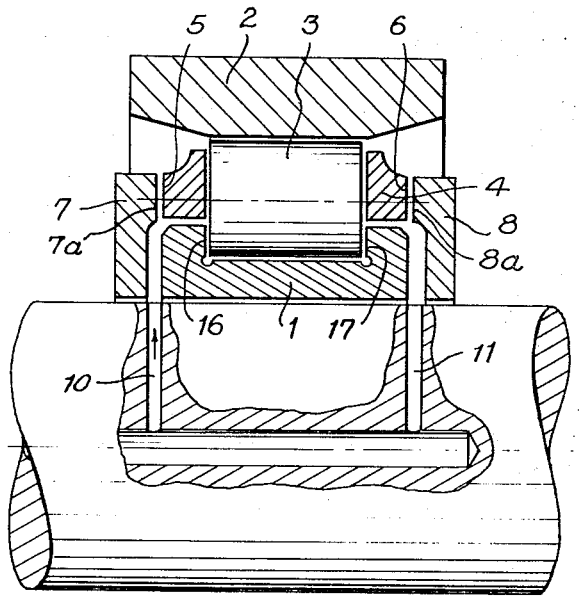
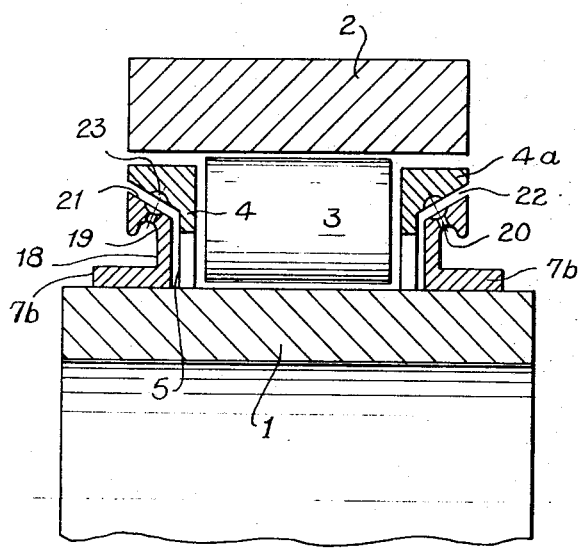

ABSTRACT OF THE DISCLOSURE

The cage of a high speed anti-friction roller bearing is hydraulically driven by the rotating shaft by means of a hydraulic coupling.

---

This invention relates to a device for supporting high-speed shafts by means of anti-friction bearings, in particular by means of roller bearings.

The normal operation condition of an anti-friction bearing, in which the rolling elements run on the outer and inner races without skidding, is considered an ideal running condition from a kinematic point of view. In this case, the rotational speed of the rolling elements about their own axes and the rotational speed of the rolling element set located in the cage will correspond to the speed vectors to be determined theoretically on the basis of the bearing dimensions. It has been found, however, that, in 'fact, this kinematically ideal running condition does not exist under many operation conditions. Above all, this will be the case where friction forces such as lubrication and ventilation which have a decelerating effect on the cage set rolling elements, exceed the driving moments acting on the contact surface of inner race and rolling elements. In this case, the cage set rolling elements will not reach the ideal kinematic speed. Especially within the high r.p.m. range, there is the problem that only some of the rolling elements, i.e. those which are in the zone of load application to the bearing, have a supporting function, while the others are forced outwardly by centrifugal forces and are not in contact with the bearing inner race. If, for instance, the inner race is the rotating component of the bearing, then the non-supporting rolling elements will be braked at the outer race by, among other factors, friction 'forces, and then, upon entering the loaded zone, are subjected to sudden acceleration which will lead to increased wear.

Furthermore, the unsatisfactory functioning of anti-friction bearings on high-speed shafts may be attributed to the fact, that in cases where a residual unbalance exists, the shaft rotates like a free gyro within the limits of the bearing clearance, intermittently completely losing contact with the rolling elements, whereby the rolling elements and thus the cage are no longer driven and, decelerated by friction forces, rotate at a very low speed only. As soon as, in such a case, the bearing is subjected to a sudden load, the rolling elements and cage will have to be accelerated, also under conditions of severe skidding.

With ball bearings, these problems are partially overcome with the aid of an axial nip which, however, cannot generally reach such an extent as to ensure that the balls will rotate without any play, without, at the same time, causing increased wear due to excessive pre-loading forces. With roller bearings, the possibility of an axial nip does not exist at all.

The objects of this invention are to eliminate the above difficulties and to provide for anti-friction bearing rolling elements which will rotate at a uniform speed, without any internal nip in the bearing, in order to avoid wear which is due, on the one hand, to alternating acceleration and deceleration of the rolling elements and, on the other hand, to an excessive nip.

In general, these objects are obtained by driving the cage by the rotating shaft by hydraulic coupling means.

In an arrangement according to this invention, the difficulties as described above will be prevented in that, at all times, the bearing rollers will follow the driven cage and are pressed against the outer race by centrifugal forces. Thus, they will maintain their operating speed also through the unloaded region and are not subjected to wearing accelerations when entering the load region. This measure will increase the service life of the bearings considerably, and, moreover, will reduce the requirements for bearing cooling, since the generated friction heat will be reduced.

Another 'feature of this invention is the minimum space requirements, a fact which is of great importance for practical application, i.e. where the coupling is to be contained in a normal size bearing housing.

A further advantage is a non-wearing operation, since no metal parts are sliding on each other. Finally, this arrangement is characterized by an almost unlimited reliability in operation, since the hydrodynamic coupling takes care of the speed differential between shaft and cage, and it will also prevent transfer of a possible defect in the bearing to the shaft and vice versa.

According to another feature of this invention, the bearing lubricant is used within the coupling. This is advantageous in that no special feeding systems will be required, since the bearing will have to be supplied with oil anyhow.

According to another feature of this invention, preferably anti-friction bearings featuring outer races without lateral lips are employed. By using outer races of this type, the accumulation of oil emerging from the hydraulic coupling at the outer race and formation of an oil ring is prevented, which would cause a considerable drag on the rotating rolling elements and would increase the bearing temperature.

The driving rotating component is a collar washer positioned at the face of the cage and seated firmly either on the shaft or on the bearing inner race. The intensity of the impulses exchanged and thus the drive moment between collar washer and cage are controlled by the shape of the above-mentioned gap and the design of the surfaces. According to a feature of this invention, collar washers are arranged on both faces of the cage, thus forming two flat annular gaps. Since the exchange of impulses is not only a function of the geometrical dimensions but also, for instance, of the viscosity of the medium used, size and shape of the coupling surface are varied experimentally on a full-scale model, until the kinematically correct speed of the cage is obtained. According to a further feature of this invention, an increase in the exchange of impulses and thus an increase in cage speed is obtained by providing the cage with collars which, together with the collar washers, will form cylindrical gaps. For a further increase of the impulse exchange, the gap surfaces, in particular those of the cylindrical surfaces, are provided with profiles which, according to a further feature of this invention, are designed as pocket-type recesses. Preferably on the flat annular gaps, the surfaces are provided with hydrofoils as known 'from oil and gas lubrication of axial plain bearings, in order to effect proper separation.

A further increase of the drive moment is effected by the above-mentioned supply of the medium from the rotating shaft bore. Thus, upon entering into the coupling gap, the medium has a rotational impulse that corresponds to the rotational speed of the shaft, said rotational impulse being utilized to drive the cage.

Furthermore, this invention includes a special embodiment of the collar washer, in which these are designed as oil spray rings featuring a groove inside, in which the oil accumulates and is routed through radial passages from there to the cylindrical outer surface. In this case, the coupling gap is formed as a cylindrical gap. This arrangement is, above all, advantageous in that splash oil from the bearing housing is used for applying pressure to the hydraulic coupling which may, under certain conditions, render the oil supply via the shaft superfluous. In addition to driving the cage, this design is also capable of damping high-frequency vibrations of the cage in an axial and radial direction.

The means by which the objects of this invention are obtained are described more fully with reference to the accompanying drawings in which:

FIG. 3 is a view similar to FIG. 1 showing a modification; and

FIG. 4 is a similar view of another modification.

Figure 1:
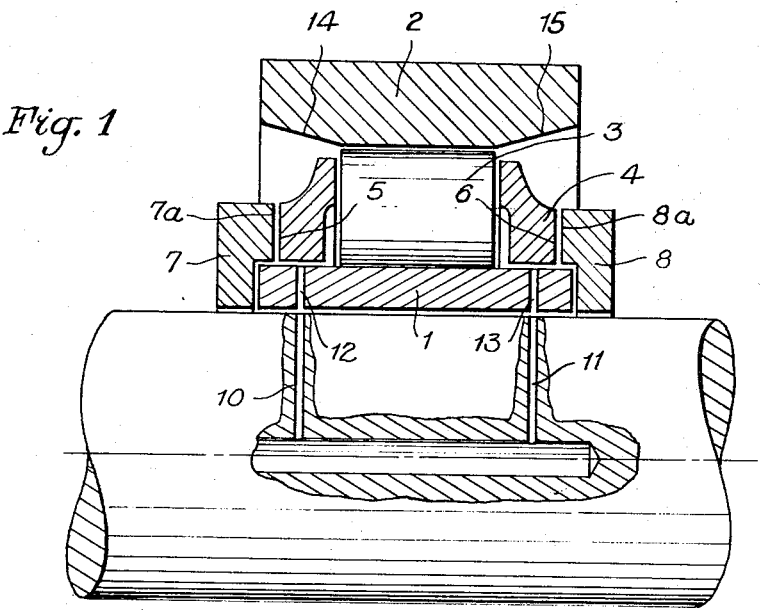
FIG. 1 is a cross-sectional view of a portion of the bearing of this invention.

As shown in FIG. 1, rollers 3 run between inner race 1 and outer race 2, said rollers 3 being contained in cage 4 and located axially of the rollers. The axial contact faces 5 and 6 of cage 4 oppose surfaces 7a and 8a of collar washers 7 and 8 and form, together with them, a flat annular gap. In a radial direction, cage 4 is supported by inner race 1. The lubricating and operating medium, such as oil, is fed through passages 10, 11 in the shaft and passages 12, 13 in inner race 1. Outer race 2 is shaped at locations 14, 15 in such a manner as to permit free outflow of the lubricating and operating medium to the sides without braking the rollers.

Figure 2:
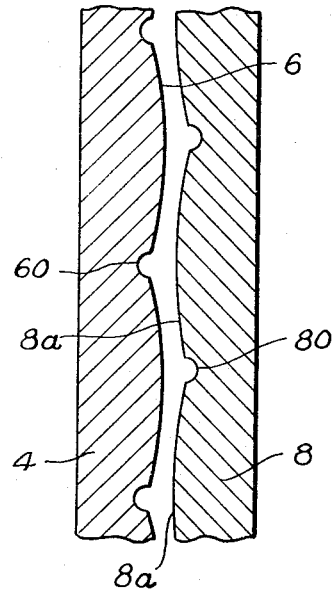
FIG. 2 is an enlarged cross-sectional detail view of the bearing gap.

FIG. 2 shows a gap profile, as used in the flat annular gaps according to FIG. 1. In this case, the corrugated surfaces 6 and 8a effect a hydrodynamically satisfactory separation between cage 4 and collar washer 8. To increase the exchange of impulses, pocket-shaped recesses 60 and 80, respectively, are provided in surfaces 6 and 8a.

FIG. 3 shows a slightly modified form of a bearing in which the rollers are guided in an axial direction by flanges 16, 17 in inner race 1, and in which the inner race is not provided with drilled passages.

FIG. 4 shows an embodiment with oil spray rings. Oil spray rings 7b, on the inside surface 18 of which a groove 19 is provided for accumulating the medium which then flows through radial passage 20 to external surface 21, are seated firmly on bearing inner race 1. On both faces of cage 4, collars 4a are arranged which, together with external surfaces 21 of oil spray rings 7b, form cylindrical gaps 22. Inasmuch as the cage is circular and the gaps are inclined to the center axis of the circle, it follows that each gap has a conical shape. Cage 4 is located in an axial direction on both of its faces by oil spray rings 7b. Pocket-type recesses 23 are arranged in the gap area between cage and rings 7b, in order to increase the exchange of impulses between the rings 7b and cage.

Having now described the means by which the objects of this invention are obtained, we claim:

1. An anti-friction bearing supporting a high speed shaft, comprising a shaft, a cage on said shaft for the rolling elements of the bearing, hydraulic coupling means for driving said cage, said hydraulic coupling means being composed of a driving component fixed to said shaft and said cage as a driven component, said driving component and said driven component having facing surfaces separated by a gap, and said facing surfaces being profiled for obtaining the maximum exchange of hydraulic impulses between the components.

2. A bearing as in claim 1, said driving means comprising said shaft.

3. A bearing as in claim 1, said hydraulic coupling means including bearing lubrication oil.

4. A bearing as in claim 3, further comprising a lipless outer race in said bearing.

5. A bearing as in claim 1, said driving component comprising a collar washer fixed to said shaft.

6. A bearing as in claim 1, said driving component comprising a pair of collar washers fixed to said shaft on both faces of said bearing cage.

7. A bearing as in claim 6, said facing surfaces being of cylindrical shape.

8. A bearing as in claim 1, in which the profiled surfaces include pocket-type recesses.

9. A bearing as in claim 8, in which the profiled surfaces include hydrofoils.

10. A bearing as in claim 1, said driving component comprising an oil spray ring collar washer fixed to said shaft, an oil collecting groove in said washer, and bore means in said washer for passing oil from said groove through said washer to said gap between said facing surfaces.

11. A bearing as in claim 1, each gap being of conical shape.

References Cited

UNITED STATES PATENTS

| | | | |
|---|---|---|---|
| 2,977,161 | 3/1961 | Cobb | 308—187 |
| 3,195,965 | 7/1965 | Van Dorn | 308—187 |
| 2,911,267 | 11/1959 | Small, Jr. | 308—187 |

FOREIGN PATENTS

| | | | |
|---|---|---|---|
| 541,636 | 5/1922 | France | 308—187 |

FRED C. MATTERN, JR., Primary Examiner

FRANK SUSKO, Assistant Examiner

U.S. Cl. X.R.

308—217